(12) United States Patent  (10) Patent No.: US 8,578,203 B2
Lubars  (45) Date of Patent: Nov. 5, 2013

(54) PROVIDING A BACKUP SERVICE FROM A REMOTE BACKUP DATA CENTER TO A COMPUTER THROUGH A NETWORK

(75) Inventor: Steve Lubars, Newton, MA (US)

(73) Assignee: Autonomy, Inc., San Francisco, CA (US)

( * ) Notice: Subject to any disclaimer, the term of this patent is extended or adjusted under 35 U.S.C. 154(b) by 482 days.

(21) Appl. No.: 12/872,765

(22) Filed: Aug. 31, 2010

(65) Prior Publication Data

US 2012/0054477 A1    Mar. 1, 2012

(51) Int. Cl.
    *G06F 11/00*    (2006.01)
(52) U.S. Cl.
    USPC ........................................................ 714/4.11
(58) Field of Classification Search
    USPC ................................ 714/4.11; 713/2; 707/647
    See application file for complete search history.

(56) References Cited

U.S. PATENT DOCUMENTS

| | | | | |
|---|---|---|---|---|
| 2004/0153689 A1* | 8/2004 | Assaf | | 714/1 |
| 2004/0267926 A1* | 12/2004 | Rothman et al. | | 709/224 |
| 2007/0168481 A1* | 7/2007 | Lambert et al. | | 709/223 |
| 2009/0164529 A1* | 6/2009 | McCain | | 707/204 |
| 2011/0113012 A1* | 5/2011 | Gruhl et al. | | 707/646 |

OTHER PUBLICATIONS dictionary definition of "backup", retrieved from wikipedia: http://en.wikipedia.org/wiki/Backup on May 26, 2013.*
dictionary definition of "boot record", retrieved from wikipedia: http://en.wikipedia.org/wiki/Boot_record retrieved on May 26, 2013.*

* cited by examiner

*Primary Examiner* — Yair Leibovich

(57) ABSTRACT

A technique provides a backup service to a computer over a network. The technique involves connecting the computer to the network, and providing a backup data center with read access to a storage device of the computer through the network. The storage device includes a boot record area and a data area. The technique further involves, after read access to the storage device of the computer is provided, performing a backup operation between the computer and the backup data center through the network. The backup operation includes copying at least a portion of a boot record stored in the boot record area of the storage device of the computer to the backup data center through the network. A restore operation is capable of being performed to restore the boot record from the backup data center to the computer through the network as well.

17 Claims, 6 Drawing Sheets

PROVIDING A BACKUP SERVICE FROM A REMOTE BACKUP DATA CENTER TO A COMPUTER THROUGH A NETWORK

BACKGROUND

A typical hard disk includes at least one boot record area and a data area for storing data. For example, on a non-partitioned hard disk, the first sector typically stores a master boot record which contains code for booting an operating system. As another example, on a partitioned hard disk, the first sector of the entire hard disk device typically stores a master boot record and the first sector of each partition typically stores a volume boot record which contains code for booting programs contained in that partition.

A conventional backup system can routinely back up information from the data area of the hard disk. As a result, if the hard disk subsequently loses the information (e.g., due to a failure of the hard disk, due to inadvertent user error, etc.), the information can be recovered from the backup system.

Some conventional backup systems incrementally operate over the Internet. For example, as the information within the data area of a hard disk changes over time, a conventional backup system can incrementally backup the changed information within the data area (e.g., new and changed files which have date stamps which are more recent than the date stamp of the last backup) to a backup site over the Internet.

SUMMARY

Unfortunately, there are deficiencies associated with the above-described conventional backup systems. For example, the above-described conventional backup systems have not been applied to fully backing up an entire hard disk over the Internet. Along these lines, it has been impractical to perform complete sector-by-sector copies of entire disk images or file-by-file copies of entire file systems over the Internet due to the enormous sizes of disk images and file systems in combination with network bandwidth limitations.

Furthermore, it is not practical to back up boot records and/or operating systems on hard disks since such items typically remain in inconsistent states while the computers are running. For instance, important portions of operating systems (e.g., operating system programs, operating system data files, registry entries, etc.) typically remain open and in use and routinely change while the computers are in operation. As a result, an operating system restored from a backup taken while a computer was running the operating system would likely lead to unreliable and unstable operation of the computer.

In contrast to the above-described conventional backup systems, an improved technique provides, to a computer over a network, a backup service which is able to reliably backup an operating system as well as boot records from one or more storage devices of the computer. Such a technique involves placing the operating system and the boot records in a consistent state (i.e., files are not currently in use and are not changing), and then backing up the storage devices over the network using de-duplication and delta encoding processes. Since the operating system and the boot records are in a consistent state, any restoration of the operating system and the boot records results in continued reliable operation of the computer. Furthermore, since the technique employs de-duplication and delta encoding, it is now practical to maintain a current backup of an entire storage device via a network such as the Internet. Accordingly, such a technique is able to alleviate a substantial delay associated with a traditional full backup.

One embodiment is directed to a method of providing a backup service to a computer over a network. The method includes connecting the computer to the network, and providing a backup data center with read access to a storage device of the computer through the network. The storage device includes a boot record area and a data area. The method further includes, after read access to the storage device of the computer is provided, performing a backup operation between the computer and the backup data center through the network. The backup operation includes copying at least a portion of a boot record stored in the boot record area of the storage device of the computer to the backup data center through the network. A restore operation is capable of later being performed to restore the boot record from the backup data center to the computer (or perhaps a replacement computer) through the network as well.

Other embodiments are directed to backup and restoration systems and devices, a backup data center, an apparatus which facilitates providing a backup service between a computer and a backup data center, computer program products, as well as other techniques. Such embodiments may involve backing up and restoring operating systems in place of, or in combination with, one or more boot records. Furthermore, such embodiments may involve restoring only specific portions of a storage device (e.g., particular files, records, etc.) rather than the entirety of the storage device.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

An improved technique provides, to a computer over a network, a backup service which is able to reliably backup an operating system as well as boot records from one or more storage devices of the computer. Such a technique involves placing the operating system and the boot records in a consistent state, and then backing up the storage devices over the network using de-duplication and delta encoding processes. Since the operating system and the boot records are in a consistent state, restoration of the operating system and the boot records results in continued reliable operation of the computer. Additionally, since the technique employs de-duplication and delta encoding, it is now practical to maintain a current backup of an entire storage device via a network such as the Internet.

Figure 1:
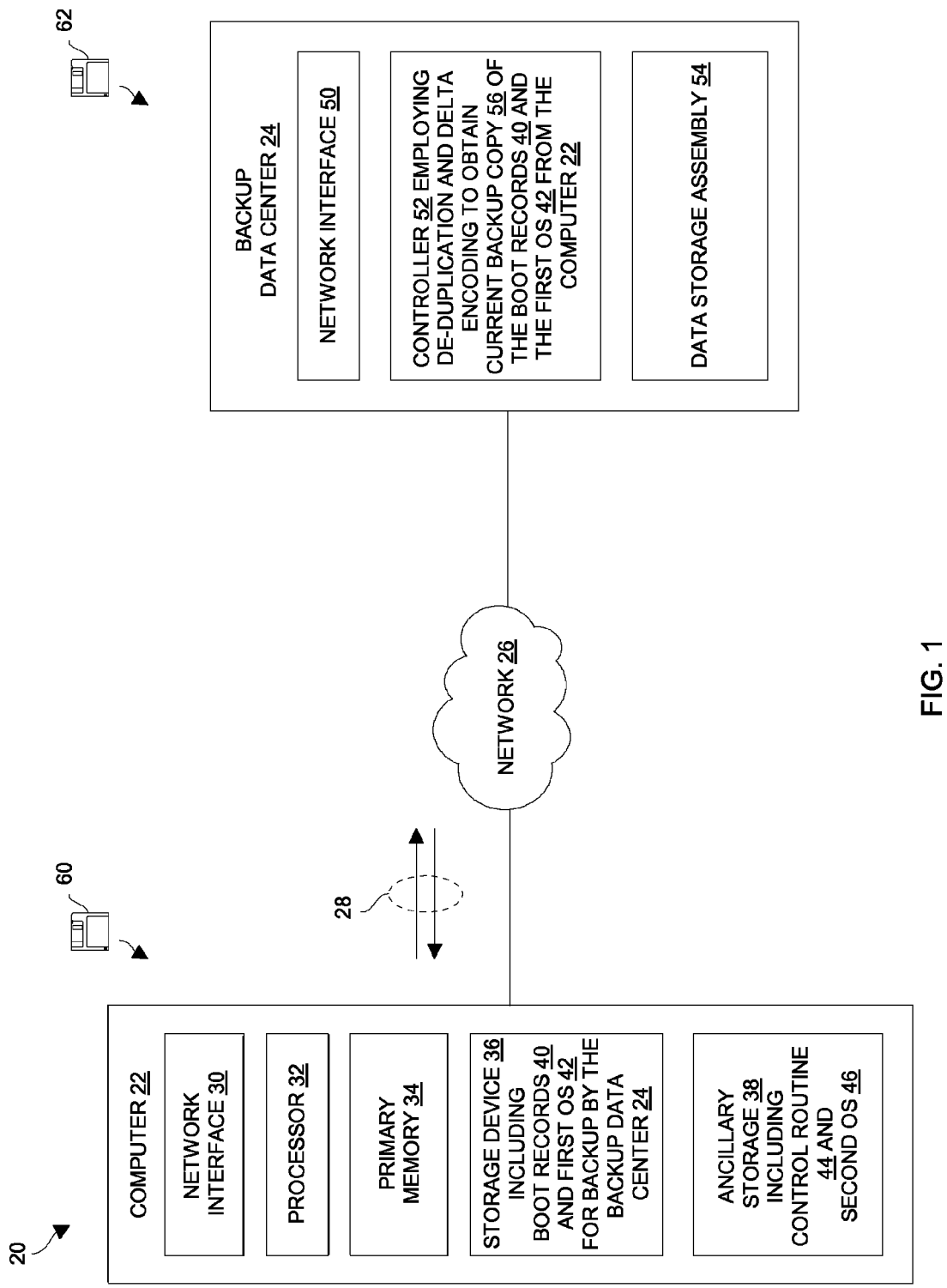
FIG. 1 is a block diagram of a computerized environment which provides a backup service from a backup data center to a computerized device over a network to reliably backup a storage device having an operating system as well as boot records.

FIG. 1 is a block diagram of a computerized environment 20 which backs up, over a network, a storage device having an operating system as well as boot records. The computerized environment 20 includes a computerized device (or simply computer) 22, a backup data center 24 and a network 26. The network 26 conveys electronic communications 28 between the computer 22 and the backup data center 24. Along these lines, the network 26 is illustrated as a cloud because it is capable of having a variety of topologies including hub-and-spoke, backbone, loop, irregular, a combination of the Internet and LAN(s), combinations thereof, and so on.

The computer 22 includes a network interface 30 to connect to the network 26, a processor 32, primary memory 34 (i.e., high speed volatile memory), a storage device 36 (i.e., slower non-volatile memory), and ancillary storage 38. The storage device 34 includes boot records 40 and a first operating system 42. The ancillary storage 38 includes a control routine 44 and a second operating system 46. Both the storage device 34 and the ancillary storage 38 are capable of being implemented in a variety of forms such as optical storage, magnetic storage, solid-state media, and so on.

The backup data center 24 includes a network interface 50 to connect to the network 26, a controller 52 to provide backup services to computers, and a data storage assembly 54 to store backups on behalf of the computers. The controller 52 (e.g., a set of processors running specialized software) is constructed and arranged to employ de-duplication and delta encoding processes when providing backup services.

During normal operation, the computer 22 runs the first operating system 42 from the storage device 36, and is capable of performing a variety of tasks. Such tasks may include activities relating to a general purpose computer (e.g., document editing by a user, providing email and web access, etc.) and/or specialized activities if the computer 22 runs specialized software (web server operations, database operations, etc.).

At some point, when the computer 22 is ready for back up, the computer 22 cleanly shuts down thus placing the storage device 36 in a consistent state. That is, any data cached in the primary memory 34 is synchronized to the storage device 36, and the information stored in the storage device 36 is no longer in a state of change. Rather, the information stored in the storage device 36, including the boot records 40 and the first operating system 42, is now stable and ready to be backed up so that any restoration enables stable and reliable execution.

To backup the storage device 36, the processor 32 is commanded to boot the second operating system 46 from the ancillary storage 38 (i.e., the ancillary storage 38 is provisioned as a second bootable device). Once the computer 22 is running the second operating system 46, the control routine 44 provides the backup data center 24 with full read access to the storage device 36 over the network 26 thus enabling the backup data center 24 to obtain a complete backup of the storage device 36. That is, the controller 52 of the backup data center 24 is able to communicate with the computer 22 through the network interface 50, and obtain a current and consistent version of all of the information on the storage device 36 including the boot records 40 and the first operating system 42 and store that version (as well as older versions) in the data storage assembly 54 for future restoration.

Along these lines, if the backup data center 24 already stores a copy of a portion of the information for another computer (also referred to as a "tenant"), a second copy is not conveyed to the backup data center 24. That is, there is no need to consume network bandwidth and additional storage space. Rather, the backup data center 24 simply increments a counter (see the controller 52 in FIG. 1) to indicate that the existing copy is now stored on behalf of both computers. This feature, which is referred to as de-duplication, is particularly useful for backing up certain information from groups of computers which have large amounts of data in common such as computers at a company all of which are running the first operating system 42.

Additionally, if there is data from the computer 22 which was previously stored at the backup data center 24 which has changed since the last backup, the backup data center 24 only copies the differences (i.e., the deltas) which exist on the storage device 36 since the last backup. The differences can be captured at a block level, a file level, or in the form of some other type of data unit. This process is referred to as delta encoding.

Once the backup data center 24 has captured the changes from the computer 22, a current backup of the entire contents of the storage device 36 now reside at the backup data center 24 and the information on the entire storage device 36 can be restored (if necessary) by combining the last backup and the recently captured differences. Furthermore, an older version of the entire contents of the storage device 36 can be restored simply from the last backup (i.e., if desired, an earlier backup of the storage device 36 without the differences can be restored to the computer 22 or a replacement computer).

It should be understood that the control routine 44 on the ancillary storage 38 can be configured to facilitate portions or all of the above-described process of quiescing the activity of the storage device 36 before engaging the backup data center 24 to carry out backing up of the storage device 36. For example, while the processor 32 is running the first operating system 42, the control routine 44 can direct the processor 32 to shutdown and restart using the second operating system 46 at a scheduled time (e.g., evenings, weekends, etc.) in order to perform the backup operations at convenient times. Alternatively, the process of quiescing the activity of the storage device 36 and engaging the backup data center 24 can be performed manually by a user or automatically by an attached device.

In some arrangements, the processor 32 initiates the backup process and pushes the data to the data center 24 through the network 26. Such arrangements provide more control over the backup process to the processor 32 (e.g., timing, frequency, security, etc.).

In other arrangements, the data center 24 initiates the backup process and pulls the data from the computer 22 through the network 26. Such arrangements provide more control over the backup process to the data center 24 (e.g., the ability to load balance and schedule relative to other backup processes, etc.).

It should be further understood that the software components on the ancillary storage 38 are capable of being delivered to the ancillary storage 38 via a computer program product 60 having a non-transitory computer readable storage medium. Similarly, the controller 52 of the backup data center 24 can be implemented using a set of processors and a set of backup applications which are delivered to the backup data center 24 via a computer program product 62 having a non-transitory computer readable storage medium. Examples of suitable computer readable storage media include tangible articles of manufacture and apparatus which store instructions in a non-volatile manner such as CD-ROM, flash memory, disk memory, tape memory, and the like.

It should be further understood that Connected® Backup offered by Iron Mountain of Boston, Mass. is a suitable data backup and recovery platform for the backup data center 24 of the computerized environment 20. Further details will now be provided with reference to FIG. 2.

Figure 2:
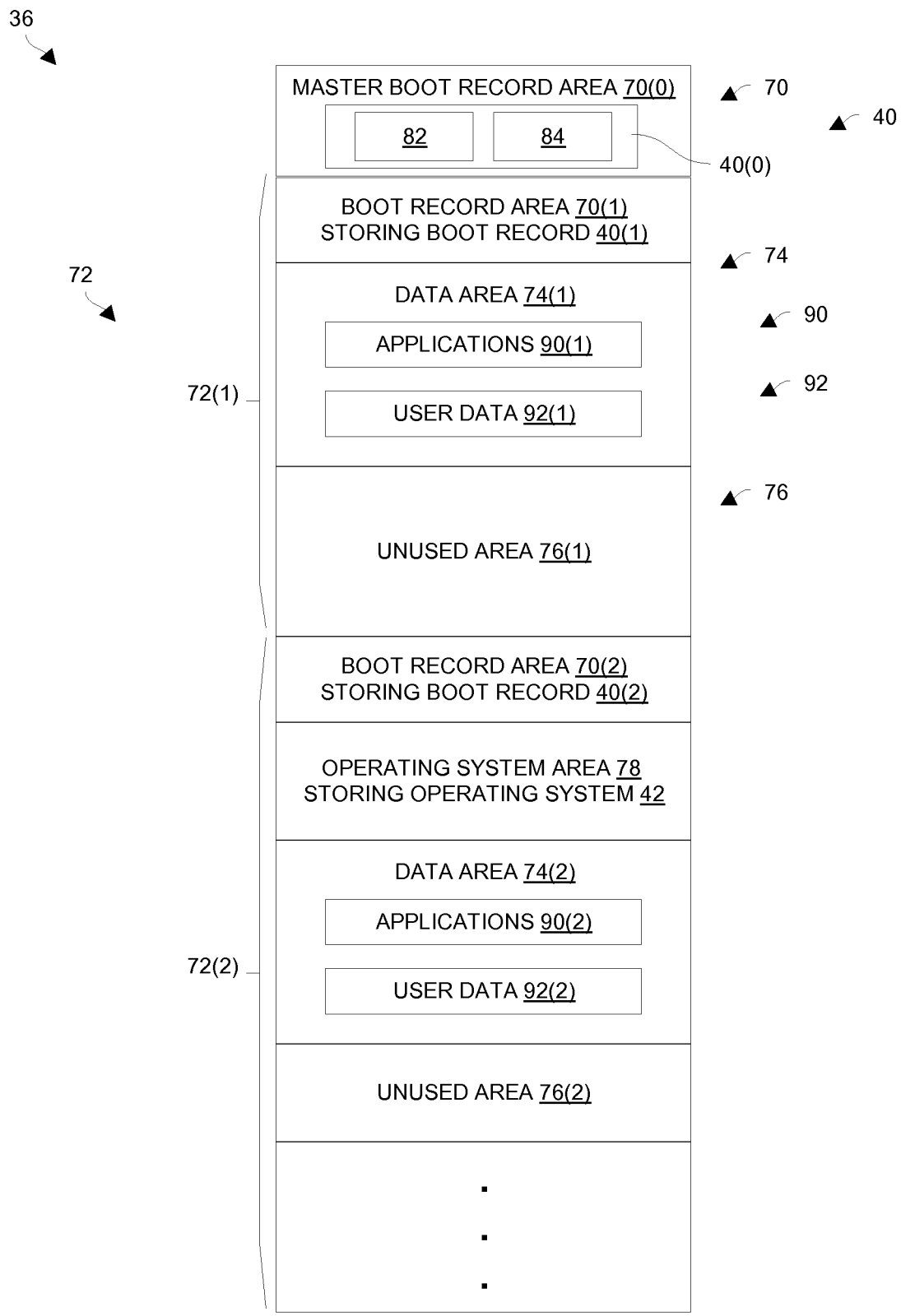
FIG. 2 is a block diagram of a storage device of the computer of FIG. 1.

FIG. 2 is a block diagram (i.e., a logical layout) of the storage device 36. The storage device 36 includes a master boot record area 70(0), and partitions 72(1), 72(2), . . . (collectively, a set of partitions 72). Each partition 72 includes a boot record area 70, a data area 74, and an unused area 76. For example, the partition 72(1) includes a boot record area 70(1), a data area 74(1), and an unused area 76(1). Similarly, the partition 72(2) includes a boot record area 70(2), a data area 74(2), and an unused area 76(2). The partition 72(2) is enhanced with an operating system area 78 which stores the first operating system 42 (also see FIG. 1).

The boot record areas 70 store respective boot records 40. In particular, the master boot record area 70(0) stores a master boot record 40(0) which includes master boot code 82 to bootstrap the computer 22 and a partition table 84 which identifies locations of the partitions 72. Additionally, the boot record area 70(1) of the partition 72(1) stores a boot record 40(1) which identifies locations for booting programs in the partition 72(1). Similarly, the boot record area 70(2) of the partition 72(2) stores a boot record 40(2) which identifies locations for booting programs in the partition 72(2), and so on.

Each data area 74 stores data such as applications (or programs) 90 and user data 92. For example, the data area 74(1) of partition 72(1) stores a set of applications 90(1) and user data 92(1). Similarly, the data area 74(2) of partition 72(2) stores a set of applications 90(2) and user data 92(2). It should be understood that, as each data area 74 of a partition 72 fills with additional data during operation of the computer 22, the data area 74 consumes (or expands into) the unused area 76 of that partition 72.

It should be understood that data within boot records 40 and the first operating system 42 may change over time. For example, the first operating system 42 may undergo an update or upgrade which changes certain operating system programs and/or data files. Additionally, changes may be made over time to the operating system registry or to particular boot records. Advantageously, the backup data center 24 is constructed and arranged to capture these changes by copying the differences since the last backup to obtain a current backup of all the information on the storage device 36 including the boot records 40 and the first operating system 42. As a result, the computer 22 can be fully restored (or replaced) by the backup data center 24 if any portion of the storage device 36, including boot records 40 and the first operating system 42, are lost.

In some arrangements, the backup data center 24 backs up the applications 90 and the user data 92 using standard de-duplication and delta encoding processes. However, in these arrangements, significant software constructs which may be relatively large in size (e.g., particular versions or releases of operating systems) are preferably stored in a pool. In this context, when the backup data center 24 initially backs up the first operating system 42 on behalf of a first tenant (i.e., a subscriber of backup services), the backup data center 24 (i) stores a backup copy of the first operating system 42 in a storage location referred to as "pool storage", (ii) creates an association between the backup copy of the first operating system 42 and the first tenant, and (iii) sets a counter to indicate that there is one tenant associated with the backup copy. Later, when the backup data center 24 is ready to back up the first operating system 42 on behalf of a second tenant (e.g., the computer 22 of FIG. 1), the backup data center 42 simply creates a second association between the backup copy of the first operating system 42 and the second tenant, and increments the counter to indicate that there is another tenant associated with the backup copy. Accordingly, there is no actual moving of data from the storage device 36 through network 26 needed to effectuate backing up the first operating system 42 on behalf of the second tenant.

It should be understood that the first operating system 42 can be backed up for additional tenants in a similar manner (i.e., adding an association to the new tenants and incrementing the counter). Furthermore, if there are changes made to the first operating system 42 for specific tenants, pool chains (i.e., mini delta encoding chains) can be established for each tenant.

It should be further understood that the storage device 36 was described above as a partitioned storage device. In other arrangements, the storage device 36 is non-partitioned or is viewed as having a single partition. Nevertheless, the backup data center 24 is capable of obtaining and maintaining a full backup of the boot record 40 and first operating system 42 of the storage device 36 via the network 26 while the storage device 36 is in a consistent state for reliable restoration. Further details will now be provided with reference to FIGS. 3 and 4.

Figure 3:
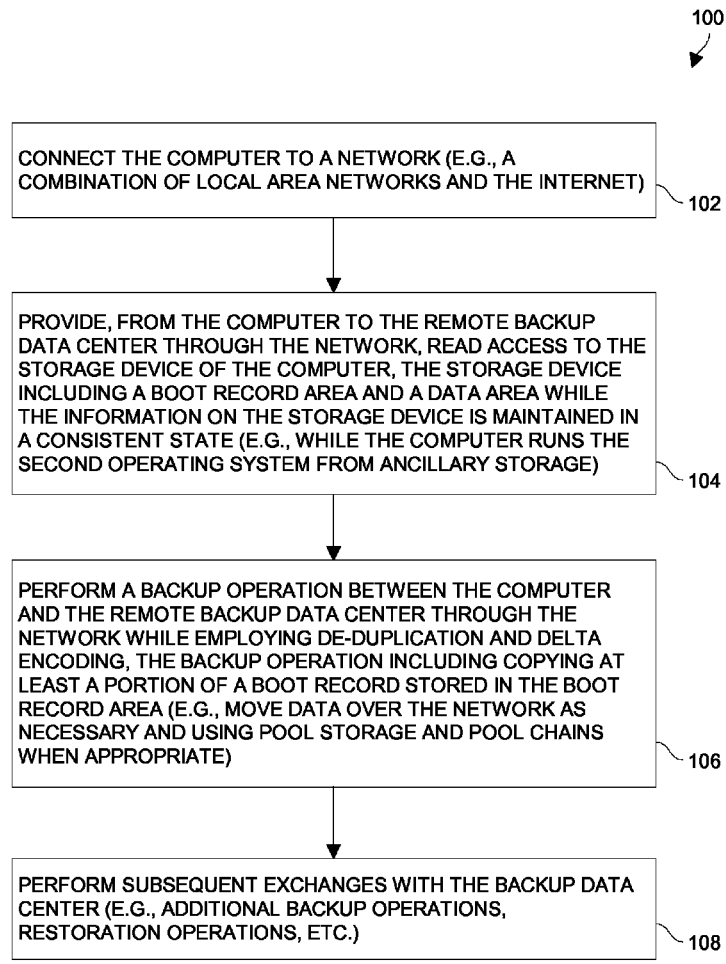
FIG. 3 is a flowchart of a backup process.
Figure 4:
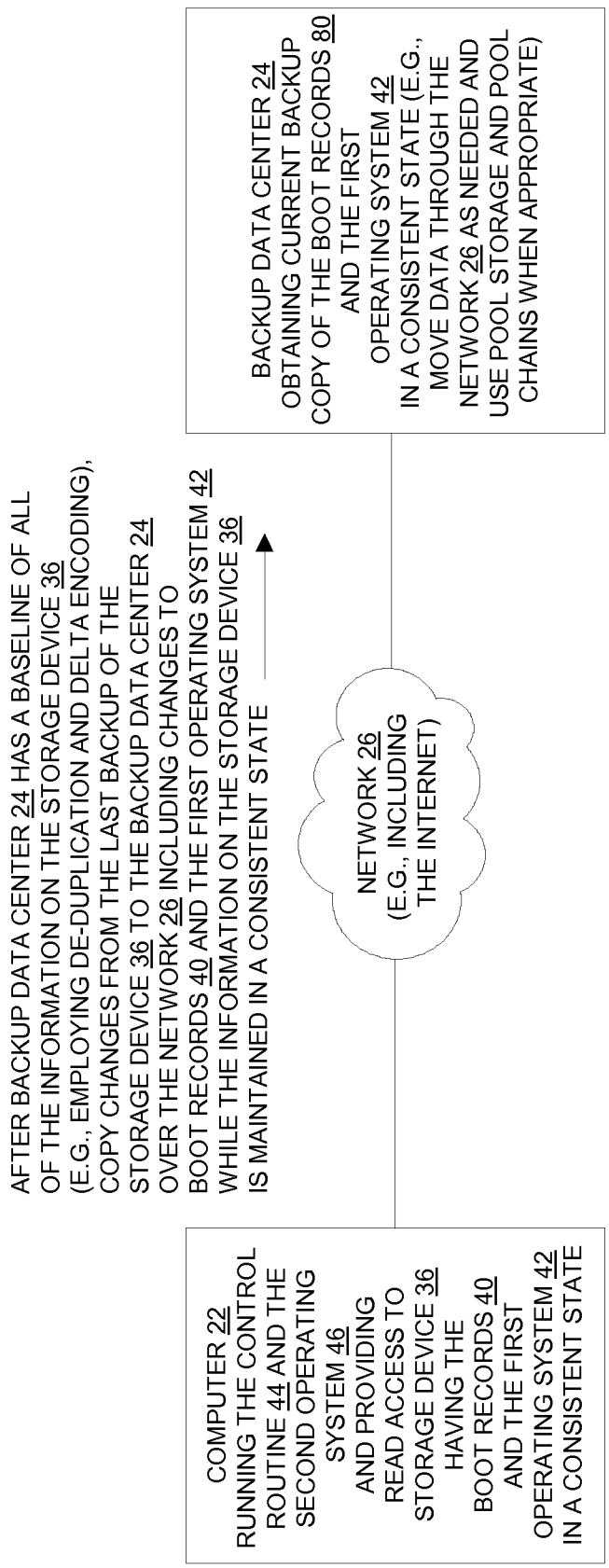
FIG. 4 is a block diagram of a portion of the system of FIG. 1 while the storage device is being backed up from the computer to the backup data center over the network.

FIG. 3 shows a flowchart of a procedure 100 which is performed within the computerized environment 20 to backup the storage device 36 of the computer 22 to the backup data center 24. FIG. 4 shows certain operational details at a particular moment during the procedure 100.

In step 102 of procedure 100, the computer 22 connects to the network 26 thus enabling the computer 22 to communicate with the backup data center 24 (also see FIG. 1). In some arrangements, at least a portion of the network 26 is the public Internet. In some arrangements, the backup data center 22 located remotely from the computer 22, e.g., geographically separated for disaster recover purposes.

In step 104, the computer 22 provides read access to the storage device 36 which includes the boot record areas 70, the operating system area 78, and the data areas 74 (also see FIG. 2) while the information on the storage device 36 is maintained in a consistent state. As mentioned earlier, the computer 22 runs the second operating system 46 and operates under direction of the control routing 44 from the ancillary storage 38 thus leaving the storage device 36 in a stable unchanging condition for reliable backup. Preferably, when the computer 22 runs the second operating system 46, the computer 22 authenticates itself with the backup data center 24 and establishes a secure communications channel with the backup data center 24 through the network 26.

In step 106, the computer 22 participates in a backup operation with the backup data center 24 to ensure that the backup data center 24 has a current version of all of the information on the storage device 36. Along these lines, the computer 22 communicates with the backup data center 24 to determine which data on the storage device 36 needs to be transferred to the backup data center 24. Advantageously, not all of the data on the storage device 36 needs to pass through the network 26 due to de-duplication and delta encoding features provided by the backup data center 24.

As shown in FIG. 4, the computer 22 is able to send only a copy of changes that have occurred to the information on the storage device 36 to the backup data center 24 over the network 26 while the computer 22 runs the second operating system 46 and the control routine 44 from the ancillary storage 38 (FIG. 1). Since the boot records 40 and the first operating system 42 stored on the storage device 36 are quiesced, the backup data center 24 is able to obtain and store a reliable copy of all of the information on the storage device 36 in the data storage assembly 54. Thus, any restoration from the data storage assembly 54, which includes the boot records 40 and the first operating system 42, will be a coherent copy which can be reliably used by the computer 22 (or perhaps replacement hardware).

Moreover, since the backup data center 24 employs de-duplication and delta encoding, the computer 22 needs to send only the differences since the last backup through the network 26. As a result, the amount of time and network bandwidth consumed are reasonable to enable completion of the backup operation in a relatively short amount of time (e.g., over night, during a weekend, etc.) via the network 26. Without de-duplication and delta encoding, the backup process via the network 26 could take an unreasonable amount of time to complete (e.g., a day, a week, etc.) thus rendering the backup service impractical for routine use.

At this point and as illustrated by step 108, additional operations can be performed. For example, subsequent backup operations can be performed between the computer 22 and the backup data center 24 through the network 26 employing de-duplication and delta encoding to create newer backups of the storage device 36. Additionally, any and all of the information from the storage device 36 can be restored including the boot records 40 and the operating system 42. Although a full restoration of all of the information from the storage device 36 may take a substantial amount of time (e.g., to restore through the network 26, to ship a replacement storage device containing the restored backup back to the tenant, etc.), it is presumed that this substantial amount of time is acceptable since the result is a full recovery and the occurrence of such recovery events is relatively infrequent. Further details will now be provided with reference to FIGS. 5 and 6.

Figure 5:
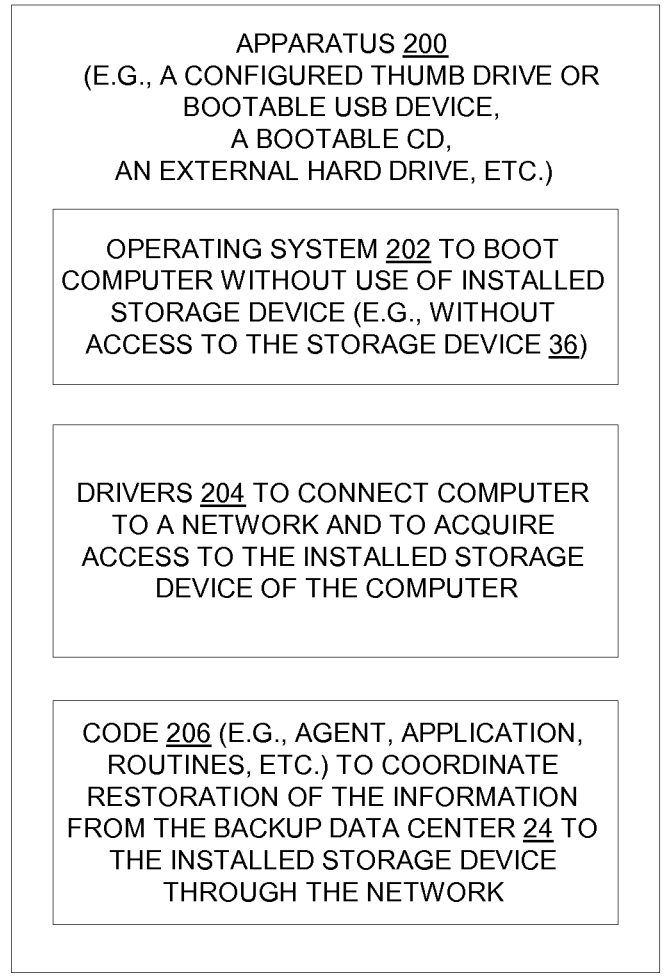
FIG. 5 is a block diagram of an apparatus which enables a computer to carrying out restoration from the backup data center over the network.

FIG. 5 shows an apparatus 200 which enables a computer to conveniently carrying out restoration of a backup of the storage device 36 from the backup data center 24 over the network 26 (also see FIGS. 1 and 2). That is, the apparatus 200 enables the computer 22 to restore all of the information backed up from the storage device 36 (e.g., if all or part of the storage device 36 was corrupted). Alternatively, the apparatus 200 enables a new computer to operate in place of the computer 22 (e.g., after a loss or catastrophic failure of the computer 22). The apparatus 200 is capable of being implemented as a provisioned thumb drive or USB device which enables the computer to boot without access to an installed storage device that is to be the restoration target. The apparatus 200 is also capable of being implemented as a bootable CD, an external hard drive, and the like.

As shown in FIG. 5, the apparatus 200 stores an operating system 202, drivers 204 and code 206. The operating system 202 enables the computer to boot without any access to the installed storage device which is the eventual restoration target. The drivers 204 enable the computer to connect the computer to connect to a network (e.g., drivers for the network interface of the computer) and to access the installed storage device (e.g., drivers to perform read/write/modify/etc operations on the installed storage device). The code 206 enables the computer to engage the backup data center 24 through the network and systematically coordinate restoration of the backup of the storage device 36 from the backup data center 24 to the installed storage device. Further details will now be provided with reference to FIG. 6.

Figure 6:
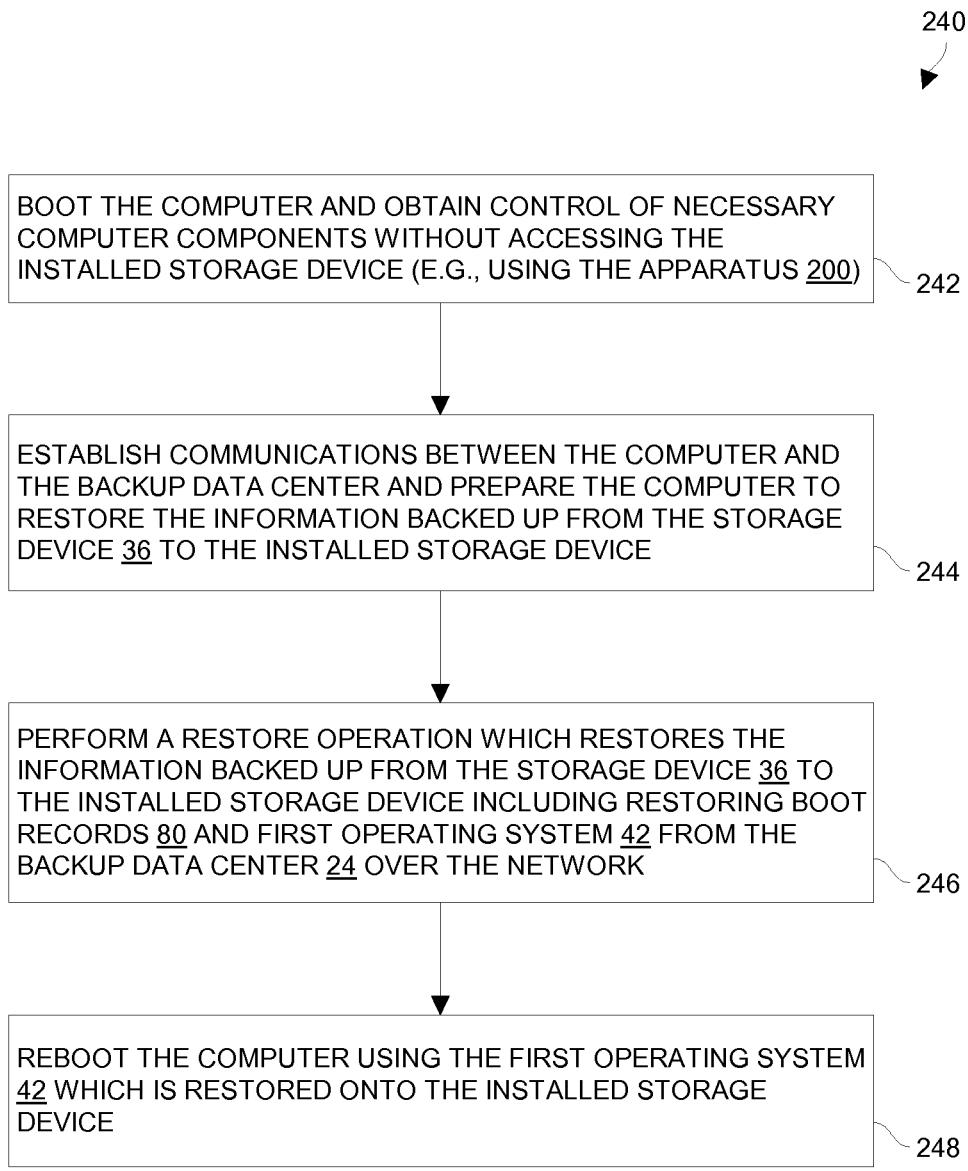
FIG. 6 is a flowchart of a restoration process.

FIG. 6 shows a procedure 240 which is performed by a processor of the computer to restore the information backed up from the storage device 36 by the backup data center 24 (FIG. 1) using the apparatus 200 (FIG. 5). In step 242 the processor boots the operating system 202 of the apparatus 200 and obtains control over the network interface and restoration target (write access to the installed storage device) via the drivers 204 of the apparatus 200.

In step 246, the computer establishes communications with the backup data center 24 through the network and prepares the computer to restore the information to the installed storage device. In particular, the code 206 enables the computer to authenticate and establish a secure channel to the backup data center 24 through the network. At this point, the computer is ready to begin a restoration operation to restore the information backed up from the storage device 36 to the installed storage device.

In step 246, the computer restores the information backed up from the storage device 36 to the installed storage device through the network. As part of this restoration, the computer writes the boot records 40 and the first operating system 42 to the installed storage device.

In step 248, the code 206 of the apparatus 200 directs the processor of the computer to reboot using the first operating system 42 on the installed storage device, and the apparatus 200 can be removed. Alternatively, the reboot step can be performed manually by a user. Since the backup was taken from the storage device 36 while information was in a consistent stable state, the computer operates normally in a non-problematic manner.

As described above, improved techniques provide, to computers 22 over networks 26, backup services which reliably backup operating systems 42 as well as boot records 40 from storage devices 36 of the computers 22. Such techniques involve placing the operating systems 42 and the boot records 40 in consistent states, and then backing up the storage devices 36 over the networks 26 using de-duplication and delta encoding processes. Since the operating systems 42 and the boot records 40 are in consistent states, restoration of the operating systems 42 and the boot records 40 results in continued reliable operation of the computers 22. Additionally, since the technique employs de-duplication and delta encoding, it is now practical to backup each storage device 36 over a public network, e.g., the Internet.

While various embodiments of the invention have been particularly shown and described, it will be understood by those skilled in the art that various changes in form and details may be made therein without departing from the spirit and scope of the invention as defined by the appended claims.

For example, it should be understood that the apparatus 200 (FIG. 5) is capable of being formed by portions of the computer 22, i.e., the apparatus 200 can be built-in to the computer 22. In this arrangement, the components 202, 204 and 206 can reside in the ancillary storage 38 (e.g., the operating system 202 can be the second operating system 46).

Additionally, it should be understood that the ancillary storage 38 can be implemented as a peripheral device or second magnetic hard disk that the processor 32 boots from during the backup process. In some arrangements, the processor 32 can run a scheduler or automated routine which directs the processor 32 of the computer 22 to periodically shutdown the first operating system 42 and boot the second operating system 46 (e.g., nightly, weekly, etc.) in order to back up the storage device 36 to the backup data center 24 on a routine basis (see FIG. 1).

Furthermore, it should be understood that the computer 22 can be implemented as a general purpose computer which is augmented with special software and/or circuitry as described above. In other arrangements, the computer 22 is a computerized device which not just an augmented general purpose computer such as a laptop device, a smart phone, a smart pad, a server, etc. Such alternatives and enhancements are intended to belong to various embodiments of the invention.

What is claimed is:

1. A method of providing a backup service to a computer, the method comprising:
   connecting the computer to a network using a first operating system;
   directing the computer to run a second operating system to maintain the first operating system in a consistent state during the backup service;
   providing, from the computer to a remote backup data center through the network, read access to a storage device of the computer, the storage device including a boot record area, a first operating system area, and a data area; and
   after the read access to the storage device of the computer is provided, performing the backup service between the computer and the remote backup data center through the network, the backup service including copying at least a portion of a boot record and at least a portion of the first operating system stored in the storage device of the computer to the remote backup data center through the network,
   wherein the data area stores a set of applications and user data; and
   wherein performing the backup service further includes ensuring that the remote backup data center possesses a current version of the set of applications and the user data stored in the data area via de-duplication and delta encoding processes.

2. A method as in claim 1 wherein the boot record area holds a master boot record; and
   wherein copying at least the portion of the boot record stored in the boot record area includes copying at least a portion of the master boot record from the boot record area of the storage device of the computer to the remote backup data center through the network.

3. A method as in claim 2 wherein the master boot record includes boot code to boot the computer and a partition table; and
   wherein copying at least the portion of the master boot record includes copying at least a portion of the boot code and the partition table from the boot record area of the storage device of the computer to the remote backup data center through the network.

4. A method as in claim 1, wherein, prior to copying at least the portion of the first operating system from the operating system area, the remote backup data center stores a copy of the first operating system in a pool on behalf of another computer; and
   wherein copying at least the portion of the first operating system from the operating system area includes incrementing a counter associated with the copy of the first operating system stored in the pool in accordance with a de-duplication process.

5. A method as in claim 4 wherein copying at least the portion of the first operating system from the operating system area further includes updating a first pool chain associated with the computer with changes to the first operating system in accordance with a delta encoding process.

6. A method as in claim 1, wherein directing the computer to run the second operating system to maintain the first operating system in the consistent state includes:
   providing a shutdown command to the computer to shutdown the computer, and
   after the computer has shutdown, booting the second operating system on the computer.

7. A method as in claim 6 wherein connecting the computer to the network includes connecting the computer to the Internet; and
   wherein copying at least the portion of the first operating system from the operating system area of the storage device of the computer to the remote backup data center through the network includes sending at least the portion of the first operating system from the computer to the remote backup data center through the Internet.

8. A method as in claim 1, further comprising:
   performing a restore operation between the remote backup data center and the computer through the network, the restore operation including copying the boot record from the remote backup data center to the boot record area of the storage device of the computer through the network.

9. A method as in claim 8 wherein the storage device further includes an operating system area which stores a first operating system that is backed up at the remote backup data center by the backup service; and
   wherein performing the restore operation further includes copying the first operating system from the remote backup data center to the operating system area of the storage device of the computer through the network while the computer runs a second operating system which is different than the first operating system.

10. A method as in claim 9, further comprising:
    prior to performing the restore operation, booting the second operating system on the computer from memory which is separate from the storage device.

11. A remote backup data center to provide a backup service to a computer, wherein the computer includes a first operating system and a second operating system, the second operating system maintains the first operating system in a consistent state during the backup service, the remote backup data center comprising:
    a network interface;
    a data storage assembly; and
    a controller coupled to the network interface and the data storage assembly, wherein the controller is to:
    connect to a network through the network interface,
    obtain, from the computer through the network, read access to a storage device of the computer, the storage device including a boot record area, a first operating system area, and a data area, and
    after the read access to the storage device of the computer is obtained, participate in the backup service with the computer through the network, the backup operation including copying at least a portion of a boot record and at least a portion of the first operating system stored in the storage device of the computer to the data storage assembly through the network,
    wherein the data area stores a set of applications and user data; and
    wherein, to participate in the backup service, the controller ensures that the remote backup data center possesses a current version of the set of applications and the user data stored in the data area via de-duplication and delta encoding processes.

12. A remote backup data center as in claim 11,
    wherein the controller, when performing the backup service, is to copy at least a portion of the first operating system from the operating system area of the storage device of the computer to the data storage assembly through the network while the computer runs the second operating system to maintain the first operating system in a consistent state.

13. A remote backup data center as in claim 12 wherein the boot record area of the storage device of the computer stores a master boot record; and wherein the backup service further includes copying at least a portion of the master boot record from the boot record area of the storage device of the computer to the data storage assembly through the network.

14. A remote backup data center as in claim 11, further comprising:

performing a restore operation which includes copying a boot record from the data storage assembly to the boot record area of the storage device of the computer through the network.

15. A remote backup data center as in claim 14 wherein the storage device further includes an operating system area to store a first operating system that is backed up in the data storage assembly; and wherein the restore operation further includes copying the first operating system from the data storage assembly to the operating system area of the storage device of the computer through the network while the computer runs a second operating system which is different than the first operating system.

16. A non-transitory computer readable storage medium that stores a set of instructions which, when run by a remote backup data center, directs the remote backup data center to:

connect to a computer through a network, wherein the computer runs a first operating system during a normal operation and a second operating system during a backup service, the second operating system maintains the first operating system in a consistent state during the backup service;

obtain, from the computer through the network, read access to a storage device of the computer, the storage device including a boot record area, a first operating system area, and a data area; and perform the backup service between the computer and the remote backup data center through the network after the read access to the storage device of the computer is obtained, the backup service including copying at least a portion of a boot record and at least a portion of the first operating system stored in the storage device of the computer to the remote backup data center through the network, wherein the data area stores a set of applications and user data; and wherein, to participate in the backup service, the computer ensures that the remote backup data center possesses a current version of the set of applications and the user data stored in the data area via de-duplication and delta encoding processes.

17. A non-transitory computer readable storage medium that stores a set of instructions which, when run by a computer, directs the computer to:

connect to a network using a first operating system;

run a second operating system to maintain the first operating system in a consistent state during the backup service;

provide, from the computer to a remote backup data center through the network, read access to a storage device of the computer, the storage device including a boot record area, a first operating system area, and a data area; and perform the backup service between the computer and the remote backup data center through the network after the read access to the storage device of the computer is provided, the backup service including copying at least a portion of a boot record and at least a portion of the first operating system stored in the storage device of the computer to the remote backup data center through the network, wherein the data area stores a set of applications and user data; and wherein, to participate in the backup service, the computer ensures that the remote backup data center possesses a current version of the set of applications and the user data stored in the data area via de-duplication and delta encoding processes.

* * * * *